United States Patent [19]
Benson

[11] 3,818,559
[45] June 25, 1974

[54] BURNISHING TOOL

[75] Inventor: William Evan Benson, Waterloo, Iowa

[73] Assignee: Deere & Company, Moline, Ill.

[22] Filed: Feb. 16, 1973

[21] Appl. No.: 333,201

[52] U.S. Cl. .................................................. 29/90
[51] Int. Cl. ....................... B21c 27/30, B24b 39/00
[58] Field of Search ......................................... 29/90

[56] References Cited
UNITED STATES PATENTS

| 723,289 | 3/1903 | Lovekin | 29/90 X |
| 1,373,857 | 4/1921 | Bosch | 29/90 |
| 1,506,988 | 9/1924 | Mirfield | 29/90 X |
| 1,683,044 | 9/1928 | Mongeau | 29/90 |
| 1,748,959 | 3/1930 | Maupin | 29/90 |
| 2,546,756 | 3/1951 | Knowlton | 29/90 X |

FOREIGN PATENTS OR APPLICATIONS

| 236,417 | 10/1961 | Australia | 29/90 |
| 923,953 | 2/1955 | Germany | 29/90 |
| 935,476 | 11/1955 | Germany | 29/90 |

*Primary Examiner*—Harrison L. Hinson

[57] ABSTRACT

A tool for burnishing the interior wall of a hollow, cylindrical workpiece includes a freewheeling mandrel for radially adjusting tapered rollers which are held in position by a stationary cage and which revolve around and burnish the interior wall of the workpiece. Burnishing can be accomplished by holding the workpiece stationary and rotating the tool or by holding the tool stationary and rotating the workpiece.

6 Claims, 3 Drawing Figures

BURNISHING TOOL

BACKGROUND OF THE INVENTION

This invention relates to tools for burnishing a workpiece and, more particularly, to a tool for burnishing the interior wall of a cylindrical workpiece.

Numerous devices have been developed for burnishing the walls of workpieces. By burnishing is meant the compacting of surface material of the workpiece under pressure, and is done either to obtain a high grade finish of the burnished surface or to reduce the workpiece to a predetermined size. These presently used devices are rather mechanically complex and require a multiplicity of parts, thereby increasing the cost of manufacture. Also, because of the multiplicity of parts, the durability of presently used devices is less than desirable.

It is therefore an object of this invention to disclose an economical and durable burnishing tool.

It is a further object of this invention to present a burnishing tool having a simplicity of design and an ease of manufacture.

It is a further object of this invention to present a burnishing tool wherein a tapered mandrel freewheels to radially adjust a plurality of rollers held by a stationary cage to engage the inner surface of the workpiece and, by rotation, burnish the surface.

SUMMARY OF THE INVENTION

In accordance with the invention, the burnishing tool includes a holder shank to which a tapered mandrel is rotatably attached. A cage, stationarily attached to the holder shank, holds a plurality of tapered rollers in position about the mandrel. In operation, a hollow cylindrical workpiece is introduced over the rollers and through rotation of the workpiece, the rollers burnish the interior wall of the workpiece as the mandrel continuously radially adjusts the rollers to assure proper fitting of the rollers against the interior wall surface to be burnished.

BRIEF DESCRIPTION OF THE DRAWINGS

Other objects and advantages of the invention will become apparent upon reading the following detailed description and upon reference to the drawings, in which.

DESCRIPTION OF THE PREFERRED EMBODIMENT

Figure 1:
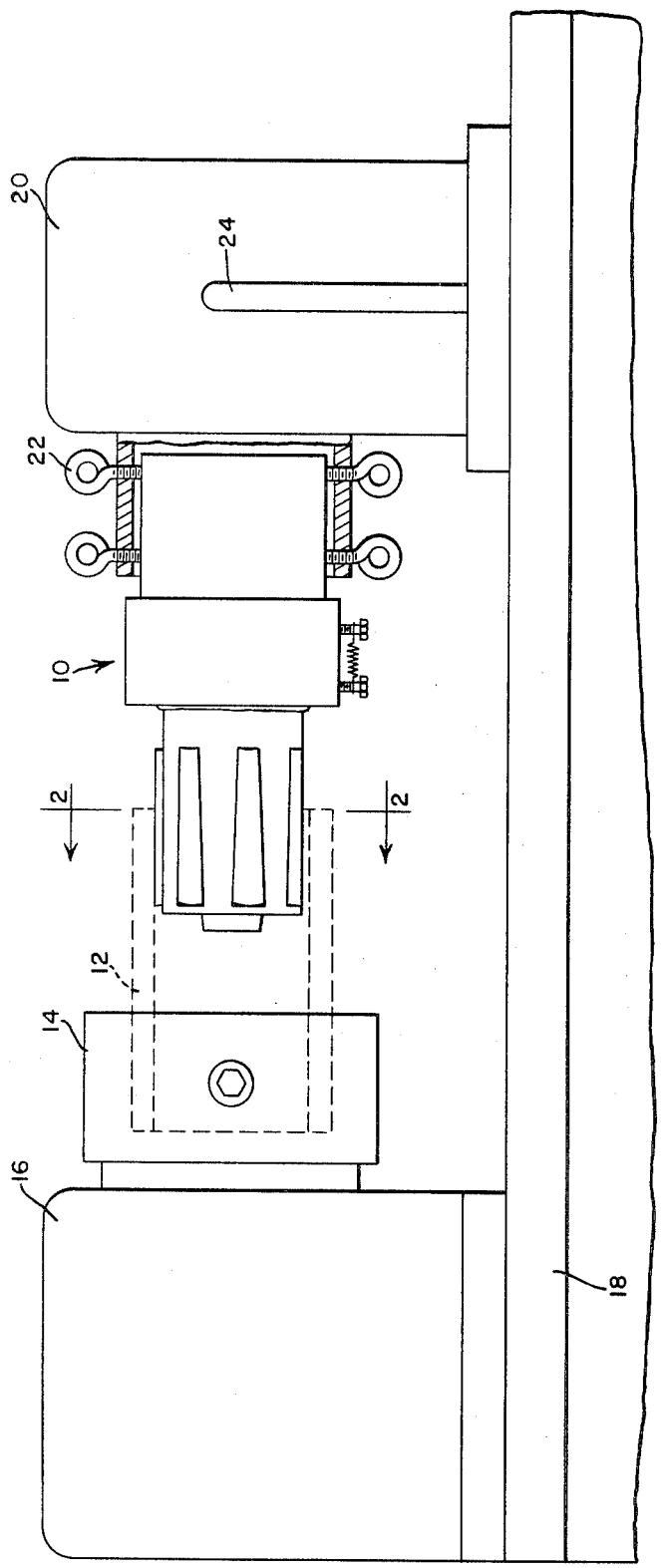
FIG. 1 is an overall view of the burnishing tool of this invention showing the interior wall of the workpiece being burnished.

Turning now to FIG. 1 of the drawings, the burnishing tool 10 of this invention is shown in operation burnishing the interior wall of a hollow cylindrical workpiece 12 (shown dotted). Workpiece 12 is rotatably affixed by means of chucking device 14 to a rotating power source 16 which, in turn, is stationarily mounted on a table 18. Burnishing tool 10 is attached to a clamping device 20 which includes a plurality of eyebolts 22 for rigidly holding the burnishing tool in pressure engagement and which is adapted for fore-and-aft movement on table 18. By manipulation of lever 24, an operator can move the burnishing tool 10 into engagement with and disengagement from the workpiece 12 in a conventional manner.

Figure 3:
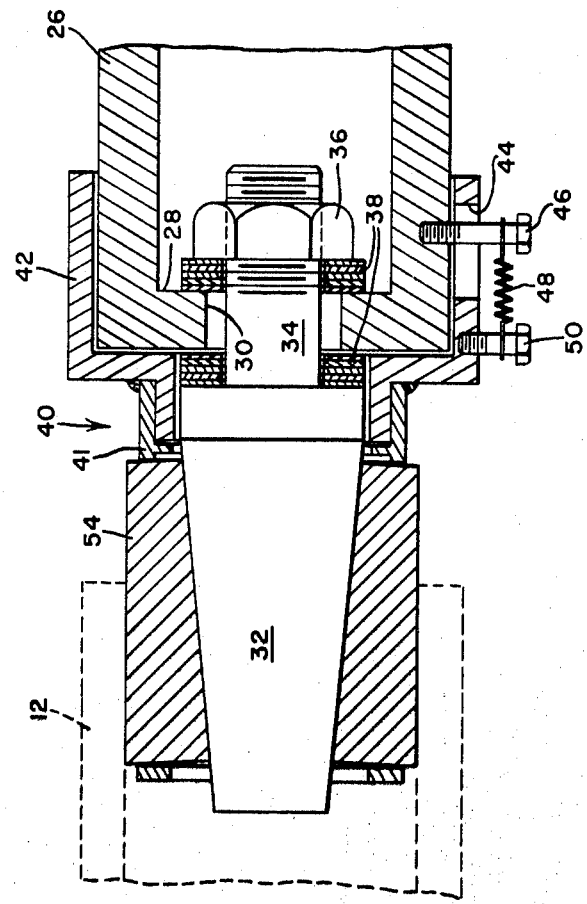
FIG. 3 is a cross sectional view of the burnishing tool of this invention taken along lines 3—3 of FIG. 2.
Figure 2:
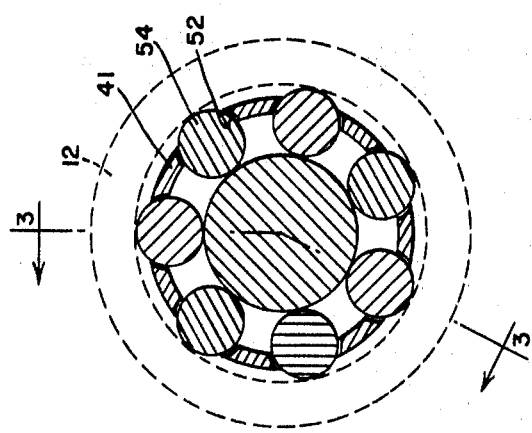
FIG. 2 is a cross sectional view taken along lines 2—2 of FIG. 1.

Turning now to FIGS. 2 and 3 of the drawings, the components of burnishing tool 10 will be discussed in detail.

A cylindrical hollow holder shank 26, the rearward portion of which is clamped in clamping device 22 (not shown in FIG. 3), carries on its forward end an inwardly depending flange 28 which defines an annular aperture 30. A frustoconical-shaped mandrel 32 tapered downwardly and forwardly extends forwardly from flange 28 and is rotatably coupled in a freewheeling manner to holder shank 26 by an integral shaft 34 which passes through aperture 30 and is capped rearwardly of flange 28 by nut 36. Suitable thrust washers or bushings 38 are inserted over shaft 34 between the edges of flange 28 and nut 36 and the rearward end of mandrel 32 respectively. Attention is drawn to the fact that the O.D. of shaft 34 is somewhat smaller than the diameter of aperture 30 and that nut 36 is not drawn into tight engagement so that provision is made for tilting or lateral play of mandrel 32 for compensating for slight misalignment between the tool 10 and the workpiece 12.

A roller cage 40 surrounds mandrel 32 and includes a rearwardly projecting, enlarged diameter annular flange forming a collar 42 which slips loosely over the forward end of holder shank 26. In order to provide fore-and-aft movement of roller cage 40 with respect to holder shank 24, while preventing relative rotative movement therebetween, collar 42 has milled therein an elongated slot 44 through which passes a pin 46 fastened to the holder shank 26 by suitable means such as by being threaded into a bore hole. Biasment of the roller cage toward the holder shank is provided by a spring 48 connected on one end to pin 46 and on the other end to collar 42 through a second pin 50 threaded into the side of the collar.

Roller cage 40 further includes a cylindrical member 41 extending forwardly from collar 42 and containing a plurality of tapered, elongated recesses 52, each one of which receives a tapered frustoconical-shaped roller 54 which cooperatively surrounds mandrel 32. Rollers 54 are tapered complementarily of the mandrel.

As can be seen by viewing FIG. 3, rollers 54 are in engagement with the outer surface of mandrel 32 and hence, since both the mandrel and the rollers are complementarily tapered, any relative movement between the two will cause the rollers to be radially adjusted. As can be seen in FIG. 2, if the biasment of spring 48 is overcome by an external force, roller cage 40 will move away from holder shank 26 and mandrel 32 to permit the rollers to move inwardly to facilitate positioning the tool within the interior of the workpiece. Once the tool has been properly positioned, the rollers are urged into continual engagement with the surface to be burnished by the biasment of spring 48 pulling the rollers onto mandrel 32. To compensate for wear on mandrel 32 and to increase the life of burnishing tool 10, a thrust washer 38 may be added between the mandrel and flange 28 while a thrust washer is deleted between the flange and the nut. This obviously extends the effective length of mandrel 32 forwardly.

The operation of the burnishing tool 10 can best be understood by referring back to FIG. 1. Workpiece 12 is first fitted on chucking device 14 and by manipulation of lever 20 is slipped over the rollers. Rotary power source 16 is energized to rotate the workpiece 12 relative to the burnishing tool 10 which is held stationary by clamping device 14. As can be seen in FIG. 3, rotation of the workpiece will cause the rollers to rotate in one direction which, in turn, will cause the mandrel to freewheel in the opposite direction since roller cage 40 is held stationary by pin 46 as previously discussed. Since the mandrel freewheels, there is always firm contact between the rollers and the mandrel and the workpiece, and any skidding action between the workpiece, rollers and mandrel is eliminated, thus reducing friction and heat which may cause flaking of the mandrel and workpiece. Once the tool has been burnished to the desired degree, normally .001 inch, an external force can be applied to pull the cage away from holder shank 26 to permit the rollers to move inwardly to allow the workpiece to be removed.

Thus it is apparent that there has been provided in accordance with the invention a burnishing tool that is easy to manufacture and has a simplicity of parts and due to the noncomplexity thereof, is quite durable. While the invention has been described in conjunction with a specific embodiment, it is to be understood that many alternatives, modifications and variations will be apparent to those skilled in the art in light of the foregoing description. Accordingly, it is intended to embrace all such alternatives, modifications and variations that fall within the spirit and broad scope of the appended claims.

I claim:

1. An apparatus for burnishing the interior wall of a workpiece comprising:
   a. a holder shank;
   b. a tapered mandrel having an integral shank;
   c. means for rotatably securing said mandrel shank to said holder shank for lateral play and tilting of the mandrel axis with respect thereto;
   d. a roller cage surrounding said mandrel and having a plurality of recesses;
   e. means for securing said roller cage to said holder shank for limited movement lengthwise of the shank and for preventing rotation of the roller cage with respect to the holder shank;
   f. a plurality of tapered rollers received in said recesses of said roller cage and being radially adjustable by said mandrel in engagement therewith; and
   g. means for biasing said roller cage toward said holder shank.

2. An apparatus as in claim 1 wherein said roller cage includes an annular flange defining a collar surrounding said holder shank and wherein said means for securing said cage to said shank for limited movement lengthwise of said shank comprises a pin secured to the wall of said holder shank and extending through an elongated slot provided in said collar.

3. An apparatus as in claim 1 wherein said holder shank includes an inwardly depending flange from which said mandrel extends forwardly and wherein said means for rotatably securing said mandrel to said holder shank comprises an integral shaft on the end of the mandrel and passing through the opening defined by said flange; said shaft being capped on its rearward end to rotatably secure said mandrel to said holder shank.

4. An apparatus as in claim 3 wherein said aperture defined by said inwardly depending flange is of a diameter greater than said shaft passing therethrough whereby said mandrel is universally tiltable with respect to said holder shank.

5. An apparatus as in claim 4 further including thrust washers on each side of said inwardly depending flange and intermediate said mandrel and said capped end of said shaft.

6. A tool for burnishing the inner surface of a hollow cylindrical workpiece comprising a hollow holder shank having an inwardly flanged end; a tapered mandrel having a shank extending through the opening defined by the flanged end of the holder shank; means loosely securing the mandrel shank within the opening so the mandrel is free to rotate, more laterally and tilt with respect to the holder shank; a plurality of tapered rollers surrounding the mandrel and held in position with respect to the mandrel by a roller cage; and means nonrotatably securing the roller cage to the holder shank for limited movement lengthwise of the holder shank.

* * * * *

UNITED STATES PATENT OFFICE
CERTIFICATE OF CORRECTION

Patent No. 3,818,559       Dated 25 June 1974

Inventor(s) William Evan Benson

It is certified that error appears in the above-identified patent and that said Letters Patent are hereby corrected as shown below:

Column 4, line 37, change "more" to -- move --.

Signed and sealed this 5th day of November 1974.

(SEAL)
Attest:

McCOY M. GIBSON JR.
Attesting Officer

C. MARSHALL DANN
Commissioner of Patents